(12) United States Patent
Ma

(10) Patent No.: US 10,718,570 B2
(45) Date of Patent: Jul. 21, 2020

(54) HEATING FURNACE FOR HEATING ANNULAR COMPONENT

(71) Applicant: BEIJING GOLDWIND SCIENCE & CREATION WINDPOWER EQUIPMENT CO., LTD., Beijing (CN)

(72) Inventor: Shengjun Ma, Beijing (CN)

(73) Assignee: Beijing Goldwind Science & Creation Windpower Equipment Co., Ltd., Beijing (CN)

( * ) Notice: Subject to any disclaimer, the term of this patent is extended or adjusted under 35 U.S.C. 154(b) by 371 days.

(21) Appl. No.: 15/744,621

(22) PCT Filed: Jun. 15, 2017

(86) PCT No.: PCT/CN2017/088386
§ 371 (c)(1),
(2) Date: Jan. 12, 2018

(87) PCT Pub. No.: WO2018/059013
PCT Pub. Date: Apr. 5, 2018

(65) Prior Publication Data
US 2019/0003771 A1 Jan. 3, 2019

(30) Foreign Application Priority Data
Sep. 29, 2016 (CN) .......................... 2016 1 0868448

(51) Int. Cl.
*F27D 7/04* (2006.01)
*F27B 11/00* (2006.01)
(Continued)

(52) U.S. Cl.
CPC .............. *F27D 7/04* (2013.01); *C21D 9/663* (2013.01); *C21D 9/673* (2013.01); *F27B 11/00* (2013.01);
(Continued)

(58) Field of Classification Search
CPC .... F27D 7/04; F27D 2007/045; B23P 11/025; C21D 1/767; C21D 9/673; C21D 9/663;
(Continued)

(56) References Cited

U.S. PATENT DOCUMENTS 2,273,809 A * 2/1942 Kinzel ...................... C21D 9/08
148/641
2,279,564 A * 4/1942 Emery ...................... C21D 9/08
266/123
(Continued)

FOREIGN PATENT DOCUMENTS

CN 201971859 U 9/2011
CN 103088200 A 5/2013
(Continued)

OTHER PUBLICATIONS

International Search Report issued in International Application No. PCT/CN2017/088386, mailed from the State Intellectual Property Office of the People's Republic of China dated Aug. 29, 2017.

*Primary Examiner* — Steven S Anderson, II
(74) *Attorney, Agent, or Firm* — Finnegan, Henderson, Farabow, Garrett & Dunner LLP

(57) ABSTRACT

A heating furnace for heating an annular component, includes a furnace body, a heat medium driving component, a support part, a guide component, and a hollow cylinder. Part of the heat medium is ejected to the outer circumferential surface of the annular component through the guide part, and part of the heat medium flows through the inner channel of the hollow cylinder, and be ejected to the inner circumferential surface of the bearing via the second heat medium channel arranged on the hollow cylinder to heat the inner circumferential surface of the bearing. In this way, the hollow cylinder plays a role of distributing the gas to some extent, and as the upper end of the hollow cylinder is a (Continued)

sealed structure, the flowing gas is all converted into effective heat exchange gas flow and restricted to a heat exchange space on the bearing surface.

17 Claims, 8 Drawing Sheets

(51) Int. Cl.
  *C21D 9/663* (2006.01)
  *C21D 9/673* (2006.01)
  *B23P 11/02* (2006.01)
  *C21D 1/767* (2006.01)

(52) U.S. Cl.
  CPC ............ *B23P 11/025* (2013.01); *C21D 1/767* (2013.01); *F27D 2007/045* (2013.01)

(58) Field of Classification Search
  CPC .. C21D 9/40; C21D 9/08; C21D 9/085; F27B 11/00

USPC .................................................. 165/8, 9, 10
  See application file for complete search history.

(56) References Cited

U.S. PATENT DOCUMENTS

| | | | |
|---|---|---|---|
| 5,441,242 A | 8/1995 | Ebner | |
| 2013/0071508 A1* | 3/2013 | Nakai | B30B 11/002 |
| | | | 425/405.2 |

FOREIGN PATENT DOCUMENTS

| | | |
|---|---|---|
| CN | 104152663 A | 11/2014 |
| CN | 203960282 U | 11/2014 |
| CN | 106282527 A | 1/2017 |
| JP | H 1-260289 A | 10/1989 |
| RU | 2258750 C1 | 8/2005 |

* cited by examiner

HEATING FURNACE FOR HEATING ANNULAR COMPONENT

This application is a National Phase entry of PCT Application No. PCT/CN2017/088386, filed on Jun. 15, 2017, which claims the priority to Chinese Patent Application No. 201610868448.4 titled "HEATING FURNACE FOR HEATING ANNULAR COMPONENT", filed with the Chinese State Intellectual Property Office on Sep. 29, 2016, the entire disclosure of all of which is incorporated herein by reference.

FIELD

The present application relates to the technical field of heat treatment, and more particularly to a heating furnace for heating an annular component.

BACKGROUND

At present, an annular component such as a large size bearing of a wind turbine is normally assembled to a component such as a motor shaft via a shrink fit mounting method. The shrink fit mounting method means that a bearing is heated in a hot liquid or a hot gas before mounting, and an inner diameter of the bearing is enlarged based on thermal expansion and contraction principle. The expanded bearing can be mounted to the motor shaft, and the bearing will be fixed to the motor shaft after being cooled. The bearing is generally heated in a heating furnace, and air is typically used as a heat exchange medium in the heating furnace. A specific structure of the heating furnace in prior art is provided hereinafter.

The heating furnace includes a furnace body. A blower (such as a fan) unit, a heating component, and a support component are arranged in the furnace body. The blower unit typically has a centrifugal fan and a motor for rotating the centrifugal fan. The blower unit is mainly used to drive air to circulate in the furnace body, the heating component is used to heat the air circulating in the furnace body, and the support component is mainly used to support bearings. Since a large size bearing has a relatively large inner diameter, the space enclosed by the inner diameter is relatively large, and the flow area is relatively large accordingly. The larger the flow area is, the greater the power of the motor in a corresponding fan unit is, and the higher the energy consumption per unit time is.

In order to reduce energy consumption as much as possible, an adiabatic sealed cylinder is further arranged in the inner chamber of the bearing. The adiabatic sealed cylinder is used to enclose an inner ring space of the bearing parts under the centrifugal fan and far away from a heated surface of the conventional heating furnace plus a negative pressurized convergence space after air sweeping across the bearing. A cylindrical adiabatic sealed chamber is arranged in the center of the furnace by using the space, meanwhile, the chamber acts as an airflow accumulated "pressure forebay" for guiding and blowing device for heated surfaces of large size bearings and as a necessary structural link to obtain the inlet airflow guiding and acceleration of the high speed airflow "homogenization" blowing device, limits all of the "flowing airflow" being converted into "effective heat exchange airflow" to the heat exchange space on the bearing surface. The effective heat exchange gas flow refers to: the flowing gas flow driven by the centrifugal fan is all limited to contact and impact a lower surface, an outer surface, an inner surface, and sweep across an upper surface. The gas flow all participates in heat exchange, and converges at a suction inlet of the centrifugal fan. Thus the volume of the effective space is greatly reduced, the ratio of the centrifugal fan driving power to the "effective heat exchange gas flow" velocity is greatly decreased, and the heat exchange rate is greatly improved.

However, it is found in the practical using processes that, the heating efficiency varies greatly according to the size of the bearings heated in the heating furnace equipped with the cylindrical adiabatic sealed chamber, the heating efficiency of the bearings with a large diameter is relatively higher, and the heating efficiency of the bearings with a relatively small diameter and a thick wall is lower, that is, the cylindrical adiabatic sealed chamber cannot play its role.

In addition, as the adiabatic sealed chamber is arranged in the central region of the annular component with a large diameter, which occupies larger radial space of the heating furnace body, the overall radial size of the device body will be too large and the overall radial size may even exceeds the allowed width of transportation, which brings great difficulties for transportation and mobile plant using.

Therefore, an issue to be addressed presently by the person skilled in the art is how to solve the technical problems mentioned above.

SUMMARY

To address the above technical issue, a heating furnace for heating an annular component is provided according to the present application, which includes a furnace body. The furnace body encloses a sealed heating space, and is equipped with a heat medium driving component and a support part for the annular component, and an interior of the furnace body further includes:

a guide part, including a top plate and an annular guide plate extending vertically downward from the circumference of the top plate, wherein the top plate and the annular guide plate together with respective corresponding inner walls of the furnace body form a heat medium channel, a backflow through hole is provided on the top plate at a position opposite to the heat medium driving component, the annular guide plate is mounted on the periphery of the annular component and has a number of first heat medium channels extending radially, and each of the first heat medium channels faces exactly to an outer circumferential surface of the annular component, a hollow cylinder arranged in the annular component, wherein a circumferential space is preset between the hollow cylinder and the annular component, the upper end surface of the hollow cylinder is a sealed structure, the lower edge of the inner circumferential surface of the annular component and the outer surface form a sealed structure, and the inner chamber of the hollow cylinder is communicated with the heat medium channel formed by the annular guide plate and the bottom wall of the furnace body, the hollow cylinder has second heat medium channels which are extended radially, and each of the second medium channels is opposite to the inner circumferential surface of the annular component.

The heat medium is driven by the centrifugal fan, and the gas flow path is: the gas flows from the gas channel between the top plate and the top wall of the furnace body to the heat medium channel formed between each annular guide plate and the circumferential surface of the furnace body, part of the gas is ejected to the outer circumferential surface of the bearing (the annular component) via the first heat medium channel arranged on the annular guide plate, then returns between the top plate and the cylinder through an opening between the top plate and the bearing, and is absorbed by the centrifugal fan via the backflow through hole; the other part of the gas flows to the inner chamber of the hollow cylinder via the heat medium channel between the annular guide plate and the furnace chassis, then be ejected to the inner circumferential surface of the bearing via the second heat medium channel arranged on the hollow cylinder, returns between the top plate and the hollow cylinder through an upper opening between the hollow cylinder and the inner surface of the bearing, and is absorbed by the centrifugal fan via the backflow through hole on the top plate.

It can be seen from the flow path of the heat medium that, according to the present application, part of the heat medium flows through the inner channel of the hollow cylinder, and be ejected to the inner circumferential surface of the bearing via the second heat medium channel of the hollow cylinder to heat the inner circumferential surface of the bearing. In this way, the hollow cylinder plays a role of distributing the gas to some extent, and as the upper end surface of the hollow cylinder is a sealed structure, the flowing gas is all converted into "effective heat exchange gas flow" and restricted to a heat exchange space on the bearing surface. On the premise of the same centrifugal fan power, a high Reynolds number of the gas flow in the heat exchange region of the bearing can be obtained, a high heat exchange rate is achieved, the total flowing space of the gas flow is greatly reduced, and the flow rate is increased exponentially under the same volume flow. On the premise of the same flow rate, the volume flow is reduced greatly, the temperature rising rate of the gas flow is increased exponentially, and the power of the electric heater is decreased greatly.

Figure 1:
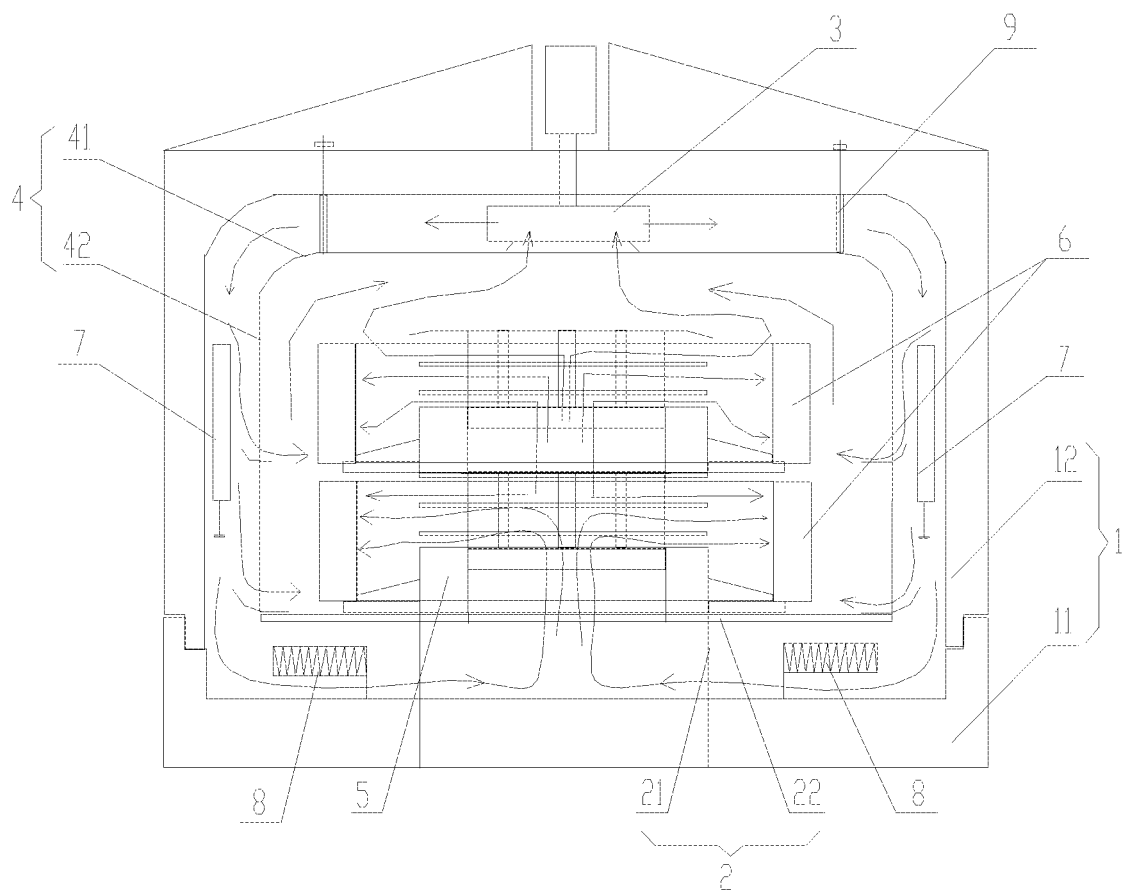
FIG. 1 is a schematic view showing the structure of a heating furnace according to an embodiment of the present application.

Corresponding relationships between reference numerals and components in FIGS. 1 to 13 are as follows:

| 1 | furnace body, | 11 | furnace chassis, |
|---|---|---|---|
| 11a | stepped sealing structure, | 12 | furnace lid, |
| 12a | stepped sealing structure, | 2 | support part, |
| 3 | centrifugal fan, | 4 | guide part, |
| 41 | top plate, | 41a | guide arc, |
| 42 | annular guide plate, | 42a | guide arc, |
| 4a | first heat medium channel, | 5 | hollow cylinder, |
| 5a | second heat medium channel, | 5b | notch, |
| 51 | support section, | 51a | step surface, |
| 511 | horizontal foot, | 512 | spigot, |
| 513 | taking out seat, | 514 | holder, |
| 515 | large diameter section, | 516 | small diameter section, |
| 511a | groove, | 511b | convex plate, |
| 52 | distributing section, | 521 | cylinder body, |
| 522 | vertical rectifying piece, | 523 | annular rectifying piece, |
| 5231 | guide arc, | 524 | connecting ring, |
| 53 | top section, | 531 | top lid, |
| 532 | connecting section, | 5311 | bending section, |
| 6 | bearing, | 7 | the first heating component, |
| 8 | the second heating component, | 9 | suspension component, |
| 91 | spacer, | 10 | frequency converter, |
| a | heat medium channel, | b | heat medium channel. |

DETAILED DESCRIPTION

With respect to the technical issue in prior art that the heating furnace efficiency varies according to different-sized bearings, a large number of experiments and theoretical studies are carried out by the present application. It is found that a main problem causing different heating efficiencies to different-sized bearings in prior art is: the cylindrical adiabatic sealed chamber is only suitable for the annual component whose inner diameter is much larger than a wall thickness. Only in such condition the cylindrical adiabatic sealed chamber can construct narrow flow passages in the case of heating an annular thin wall so as to enhance heat transfer. In the case that the inner diameter of the annular component is relatively small (especially when the inner diameter of the annular component is smaller than 200 mm, and the radial thickness is smaller than 10 mm), the effect of using the cylindrical adiabatic sealed chamber is greatly degraded.

Based on the above findings, further explores are made and a technical solution that suits for heating different-sized bearings with a relatively high efficiency is developed according to the present application.

In order to make the person skilled in the art to better understand the solution of the present application, the present application is further described in detail with reference to the drawings and embodiments. The present application describes the technical solution and the technical effect by taking an example that the annular component is a bearing, and the person skilled in the art should understand that the annular component may be other components, so the limitation that the component is a bearing should not limit the protection scope of the present application.

Figure 2:
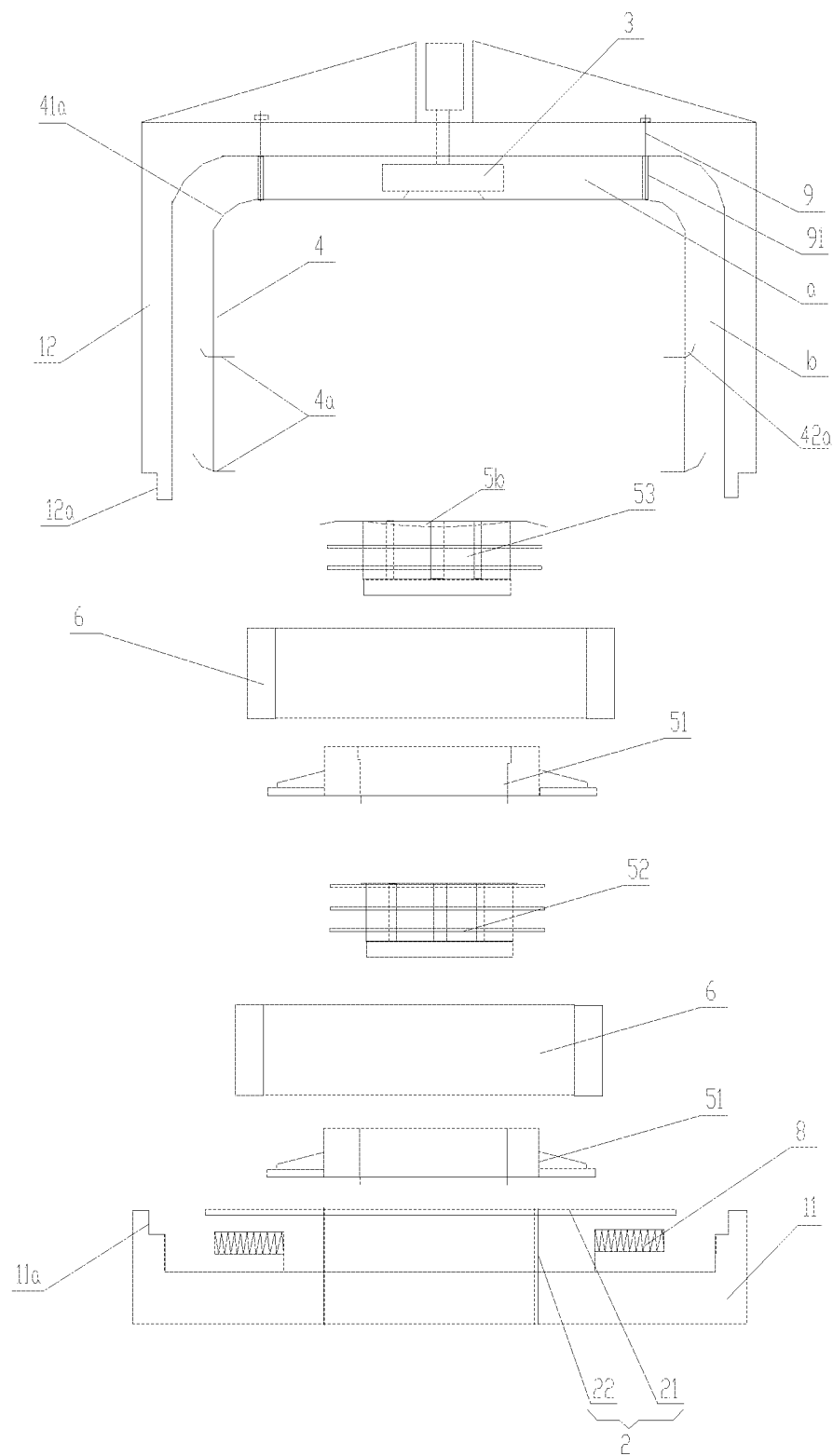
FIG. 2 is an exploded schematic view showing the heating furnace shown in FIG. 1.
Figure 3:
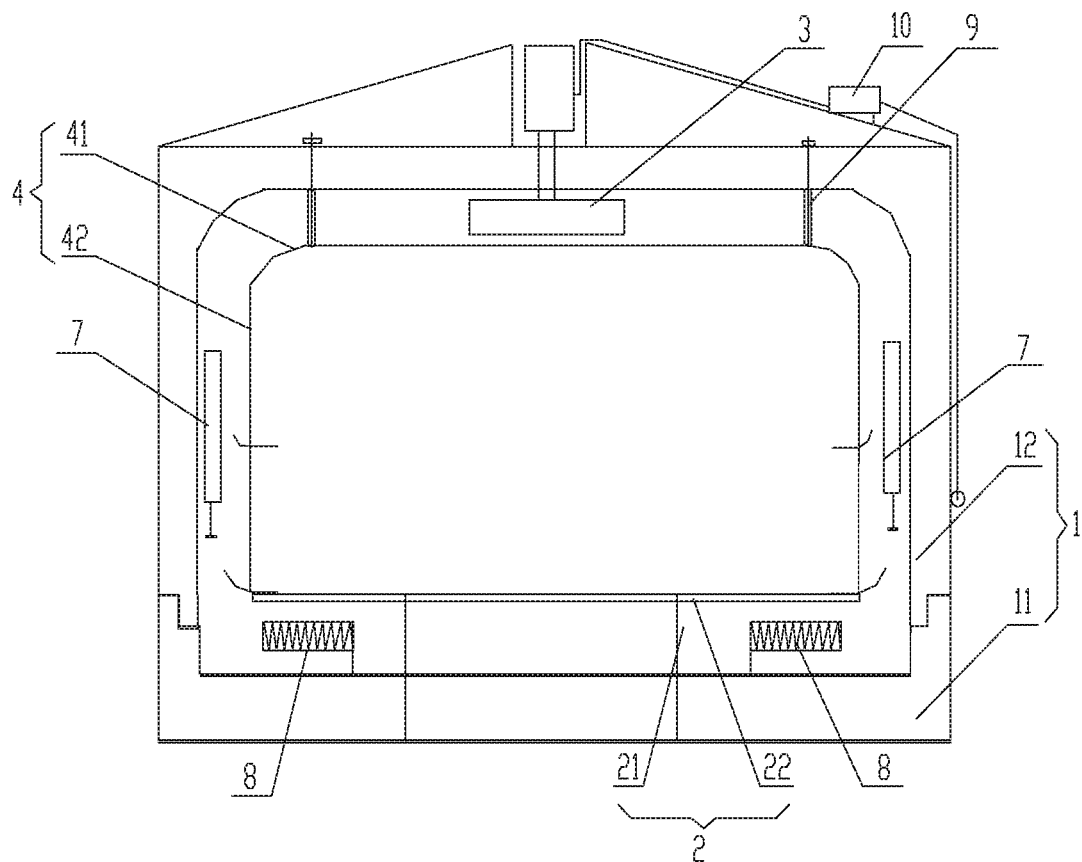
FIG. 3 is a structural schematic view showing part of the components of the heating furnace shown in FIG. 1.

Referring to FIG. 1 to FIG. 3, FIG. 1 is a schematic view showing the structure of a heating furnace according to an embodiment of the present application; FIG. 2 is an exploded schematic view showing the heating furnace shown in FIG. 1; FIG. 3 is a structural schematic view showing part of the components of the heating furnace shown in FIG. 1.

The structural feature of a bearing 6 lies in that: a radial cross section is of a "T" shape, a height of an outer circle of the bearing 6 is smaller than a height of an inner circle, double-row tapered rollers are arranged on a retainer between the inner circle and the outer circle, and a fair amount of through-holes with equidistant intervals are arranged axially in the outer circle of the bearing 6. The bearing 6 with a heavy weight and a large size (the diameter or the equivalent thickness of bearing 6 component is a characteristic size) is assembled by a heating and expanding method. In the case that the bearing 6 and a shaft is assembled with interference fit in practice, the inner circle of the bearing 6 is required to be heated, and the inner diameter expands after the bearing 6 being heated, thus, the bearing 6 may be assembled to the main shaft. As the temperature increases, the whole bearing 6 will expand in a radial direction, and when the temperature reaches a certain value, the expansion amount of the inner diameter of the inner circle of the bearing 6 exceeds the interference amount, that is the inner diameter of the inner circle of the bearing 6 equals to a diameter of the main shaft plus a assembly clearance between the main shaft and the bearing, then, the bearing 6 may be assembled to the shaft. As the temperature deceases, the inner circle of the bearing 6 contracts and the interference fit is generated and the shaft is held tightly, resulting in the interference fit. During the process, the heating temperature actually heated by the bearing 6 is calculated according to the interference value between the bearing 6 and the main shaft and the technical requirements of the main shaft shrink fit. Specific calculation may refer to the following description:

The relationship between interference amount and temperature is determined by formula (1)

$$\Delta = a \times D \times (T - T_0) \quad (1)$$

wherein: $\Delta$ is a radial interference amount, a is a thermal expansion coefficient of the material of the inner circle of the bearing, T is a equivalent temperature (or the converted temperature) required for the hot assembly of the inner circle of the bearing, $T_0$ is the environment temperature of the assembly shop when the inner circle of the bearing is being hot assembled.

It is needed to be illustrated that, the equivalent temperature (or the converted temperature) is obtained based on the following theory: in the radial direction, as the bearing expands when being heated, the temperature gradually decreases from an inner surface of the inner circle of the bearing (i.e. the assembly surface) to the half thickness of the inner circle wall of the bearing (since the bearing circle is symmetrically heated in the radial direction, similarly, it may be appreciated that the temperature variation regulation from an outer surface of the outer circle of the bearing to the half of the inner circle of the bearing). Based on the objective facts of the heat conduction law of heat transfer theory, the rule of the radial temperature reduction from the inner surface of the inner circle of the bearing to the middle surface of the intermediate annulus in the inner circle of the bearing is measurable and controllable, therefore, with the known rule of the radial temperature reduction from the inner surface of the inner circle of the bearing to the middle surface of the intermediate annulus in the inner circle of the bearing, in the geometric sense, the equivalent temperature can be obtained by using the integral mean value theorem (also called the mean value formula).

It is assumed that an initial designed radial interference amount is $\Delta$, then the target temperature being required to be heated to is:

$$T = \frac{\Delta}{a \times D} + T_0,$$

when the bearing 6 is assembled, the expansion amount need to not only meet the requirement of interference, but also have a certain assembly gap for bearing 6 to be successfully mounted to the main shaft, and heat loss will be generated during the process of extraction, hoisting and moving after the heating and before the assembly of the bearing 6, and since the temperature will further decrease, and the heating temperature should also be higher by a certain percentage point, and the final heating temperature $T_{\Delta+d}$ should be:

$$T_{\Delta+d} = \left[\frac{\Delta + d}{a \times D} + T_0\right] \times (1 + b') \quad (2)$$

wherein d is a hot assembly gap, b' is a correction coefficient for increasing the temperature of the inner circle of the bearing, d is generally set manually in actual production, b' may be an empirical value or be obtained through experiments, which relates to an exposed area and the wall thickness of the actually heated annular component.

The raising of the temperature coefficient value relates to the wall thickness and structure of the assembly parts, and is adjusted appropriately during calculation.

The heating furnace includes a furnace body. The furnace body for heating the bearing 6 is enclosed to form a sealed heating space. The furnace body typically includes two parts: a furnace lid 12 and a furnace chassis 11. The furnace lid 12 and the furnace chassis 11 are elastically sealed at a lower height. The furnace lid 12 and the furnace chassis 11 may be respectively provided with a stepped sealing structure 12a and a stepped sealing structure 11a, and the furnace lid and the furnace chassis are sealed in a stepped manner. The furnace is typically made of stainless steel, which greatly reduces impurities in the furnace and avoids the influence of the furnace service life caused by the inner wall oxidization of the furnace body at a high temperature. Moreover, the oxidation layer formed on an inner wall of the furnace body is apt to fall off and drop into the heated bearing 6 during use, resulting in the entry of the impurities into the bearing 6 and finally affects the use of the bearing 6.

The heating furnace is provided with a heating component in the furnace body, and the heating component is mainly used to heat a heat media. The heat media may be gases, such as air or inert gases, and also may be liquids such as oil, ethanol or water. The heat medium may be rationally chosen according to the heated annular component, as long as heating the annular component can be completed and the normal use of the annular component is not affected. The heating component may be an electric heating tube made of stainless steel, and may preferably be the stainless steel electric heating tube on which stainless steel spiral fins are mounted through shrink fit. Each spiral fin itself has a hole and is wave-shaped. Relying on the vibration of the spiral corrugated fin in the gas flow and the fins depending on the structure of the electric heating tube in a spiral manner, the electric heating tube is arranged vertically to a gas flow direction in the furnace body, so that a heat exchange mode with a relatively high "field synergy degree" between the air and the electric heating tube can be achieved. The "field synergy degree" described in the present application refers to the "field synergy degree" between an air flow velocity field and a temperature field (heat flow field). Under the same velocity and temperature boundary conditions, the better the synergy is, the higher the heat transfer intensity is.

Based on the above theory of a high field synergy degree between the air flow velocity field and the temperature field, the heating furnace according to the present application is further provided with a heat medium driving component and a support part 2 to support the annular component. When the heat medium is a gas, the heart medium driving component may be a centrifugal fan which is hoisted onto the top wall of the furnace lid. When the heat medium is a liquid, the heat medium driving component may be a centrifugal pump.

An interior of the furnace body of the heating furnace according to the present application further includes a guide part 4 and a hollow cylinder 5. The guide part 4 includes a top plate 41 and an annular guide plate 42 extending vertically downward from the periphery of the top plate 41. The top plate 41 and the annular guide plate 42 may be an integral structure or a separate structure, that is, the top plate 41 and the annular guide plate 42 may be integrated into a piece by means of connecting components such as flanges or processing techniques. The top plate 41 may be secured to a top wall of the furnace body by a suspension component 9. In order to insure a distance between the top plate 41 and the top wall of the furnace body, the suspension component 9 may also include a spacer 91, which is arranged between the top plate 41 and the top wall. The top plate 41 and the annular guide plate 42 together with respective inner walls of the furnace body form heat medium channels, that is, a heat medium channel is formed between the top plate 41 and the top wall of the furnace body, and a heat medium channel is formed between the annular guide plate 42 and side and bottom walls of the furnace body. FIG. 2 shows a heat medium channel a formed between the top plate and the top wall and a heat medium channel b formed between the annular guide plate 42 and the circumferential wall of the furnace body. The top plate 41 may also be connected to the annular guide plate 42 by a guide arc 41a so as to reduce the flowing resistance of the heat medium.

The annular guide plate 42 is mounted on the periphery of the annular component, and has a number of first heat medium channels 4a which are extended radially. Each of the first heat medium channels 4a faces exactly to an outer side surface of the annular component.

The hollow cylinder 5 is arranged in the annular component, that is, in the case that the annular component is assembled in the heating furnace, the hollow cylinder 5, the annular component and the guide part 4 are sleeved in a listed sequence from the inside out, and an interval is present between the hollow cylinder 5 and the annular component and between the annular component and the guide part 4 so as to form a predetermined heat medium channel. Herein a position near the vertical central shaft is defined as inside and a position away from the vertical central shaft is defined as outside.

According to the embodiments of the present application, an upper end surface of the hollow cylinder 5 is a sealed structure, that is, the upper end surface is a sealed end surface. Certainly, the sealed end surface may be a plane surface or a curved surface. A specific curved surface structure will be described in detail hereinafter.

According to the embodiments of the present application, an inner circumferential surface of the annular component and an outer circumferential wall of the hollow cylinder 5 form a sealed structure, that is, the heat medium between the annular guide 42 and the bottom wall of the furnace 1 cannot flow into a space between the hollow cylinder 5 and the annular component through the lower edges of the hollow cylinder 5 and the annular component.

An inner chamber of the hollow cylinder 5 is communicated with the heat medium channel formed by the annular guide plate 42 and the bottom wall of the furnace body, that is, the heat medium between the annular guide plate 42 and the bottom wall of the furnace can enter into the inner chamber of the hollow cylinder 5. And the hollow cylinder 5 has second heat medium channels 5a which are extended radially. Each of the second heat medium channels 5a is opposite to the inner circumferential surface of the annular component, in this way, the heat medium in the inner chamber of the hollow cylinder 5 can be ejected onto the inner circumferential surface of the annular component via the second heat medium channels 5a.

In addition, the top plate 41 has a backflow through hole at a position opposite to the heat medium driving component. The heat medium driving component is typically hoisted and installed to the center of the top wall of the furnace body, and the backflow through hole is arranged in the center of the top plate 41.

As shown in FIG. 1, a flow direction of the heat medium when the annular component is heated up in the heating furnace is indicated in the figure. The heat medium is blew by the centrifugal fan 3, and the gas flow path is that: the gas flows from the gas channel between the top plate 41 and the top wall of the furnace body to the heat medium channel formed by the annular guide plate 42 and the circumferential surface of the furnace body, and part of the gas is ejected onto the outer circumferential surface of the bearing 6 annular component) via the first heat medium channels 4a arranged on the annular guide plate 41, then returns a place between the top plate 41 and the hollow cylinder 5 through an opening between the top plate 41 and the bearing, and is absorbed by the centrifugal fan via the backflow through hole on the top plate 41.

A guide arc 42a may be further provided at an inlet of each of the first heat medium channels 4a, the guide arc 42a is a bend section bending upwards at the inlet. The guide arc is used for guiding part of the gas flowing vertically in the circumferential direction into the first heat medium channel 4a.

It can be seen from the flow path of the heat medium that, according to the present application, part of the heat medium flows through the inner chamber of the hollow cylinder 5, and be ejected to the inner circumferential surface of the bearing via the second heat medium channels 5a arranged on the hollow cylinder 5 to heat the inner circumferential surface of the bearing. In this way, the hollow cylinder 5 plays a role of distributing the gas to some extent, and as the upper end of the hollow cylinder 5 is a sealed structure, the flowing gas is all converted into "effective heat exchange gas flow" and restricted to a heat exchange space on the bearing 6 surface. On the premise of the same centrifugal fan power, a high Reynolds number of the gas flow in the bearing heat exchange region can be obtained, a high heat exchange rate is achieved, the total flowing space of the gas flow is greatly reduced, and the flow rate increases exponentially under the same volume flow. On the premise of the same flow rate, the volume flow is reduced greatly, the heating rate of the gas flow increases exponentially, and the power of the electric heater decreases greatly.

The "effective heat exchange gas flow" refers to: the flowing gas flow blew by the centrifugal fan is all limited to contact with and impact the lower surface, the outer surface and the inner surface, and limited to sweep and flush the upper surface. The gas flow all participates in heat exchange, and converges at the suction inlet of the centrifugal fan. Thus the volume of the effective space is greatly reduced, the ratio of the centrifugal fan driving power to the "effective heat exchange gas flow" velocity is greatly decreased, and the heat exchange rate of the energy transfer by the medium is greatly enhanced. Therefore the energy saving effect of the cylinder is achieved. And the effective heat exchange gas flow is greatly increased.

It has been proved by experiments that, when the annular component having a larger diameter or the annular component having a smaller diameter is heated by the heating furnace structure according to the present application, the heating efficiencies are both higher. The advantages are developed especially in the case that the annular component (such as a bearing) has a small inner diameter, a large outer diameter and a heavy weight, the radial flow path of the fluid medium will be greatly shortened, and the fluid can directly face the heated surface of the annular component via the hollow cylinder 5. Compared with the prior art, where an adiabatic cavity is arranged in the central region, the hollow cylinder 5 of the heating furnace according to the present application occupies a relative small radial space, and the integral radial size of the device is greatly reduced, which is beneficial to meet the allowed width of transportation, and brings great convenience to the transportation and the mobile plant using.

Specifically, a support part 2 according to the present application may include a support platform 22. The support platform 22 is fixed to the bottom wall of the furnace body. The hollow cylinder 5 is also supported on an upper surface of the support platform 22. The lower surface of the annular guide plate 42 and the lower surface of the hollow cylinder 5 are both circumferentially sealed with an upper surface of the support platform 22. The lower surface of the annular guide plate 42 and the lower surface of the hollow cylinder 5 are both fitly sealed with the support platform 22, and the space between the bearing 6 and the hollow cylinder 5 is separated from a channel between the annular guide plate 42 and the bottom wall of the furnace body 1 via the support platform 22. The heat medium flows through the channel between the annular component and the circumferential wall of the furnace body and into the channel between the support platform and the bottom wall of the furnace body, and then enters the inner chamber of the hollow cylinder 5.

According to the embodiment, a lower surface of the annular guide plate 42 and a lower surface of the hollow cylinder 5 are both circumferentially sealed with the upper surface of the support platform 22, that is, the lower ends of the hollow cylinder 5 and the annular guide plate 42 are contacted and sealed by the support platform 22, so that a radial size of the lower end of the annular guide plate 42 may be relatively small, and a lower end of the annular guide plate is not required to extend to an outer surface of the hollow cylinder 5, thus the structure of the annular guide plate 42 is simplified.

In the above embodiment, the support platform 22 may be supported on the bottom wall of the furnace body via a holder 21. The holder 21 has a predetermined height, which is beneficial to form the medium channel between the support platform and the bottom wall. The holder 21 may be a tubular holder. A circumferential surface of the tubular holder has multiple through holes, and the tubular holder is supported at the center of the support platform 22. The support platform 22 has through holes (not shown in FIG. 1) at positions corresponding to an inner chamber of the tubular holder, and the heat medium channel between the support platform 22 and the bottom wall of the furnace body is communicated with the inner chamber of the hollow cylinder 5 via the through holes on the support platform. The holder 21 may also be in the form of an upright post. Multiple upright posts are arranged uniformly at the circumference of the equal diameter to support, the support platform 22 stably.

The tubular holder not only has a simple structure, but also has a higher supporting strength, so that a stronger support, can be achieved with fewer components, the number of the components of the heating furnace is fewer, and the assembly accuracy and the assembly efficiency can be enhanced accordingly.

Certainly, the structure of the holder 21 is not limited to the structure described in the present application, which may be in other forms. For example, multiple holders may be arranged in the circumferential direction of the support platform 22 for realizing support.

The specific structure of the hollow cylinder 5 may has a variety of forms. A preferable embodiment according to the present application is described in detail hereinafter.

Figure 4:
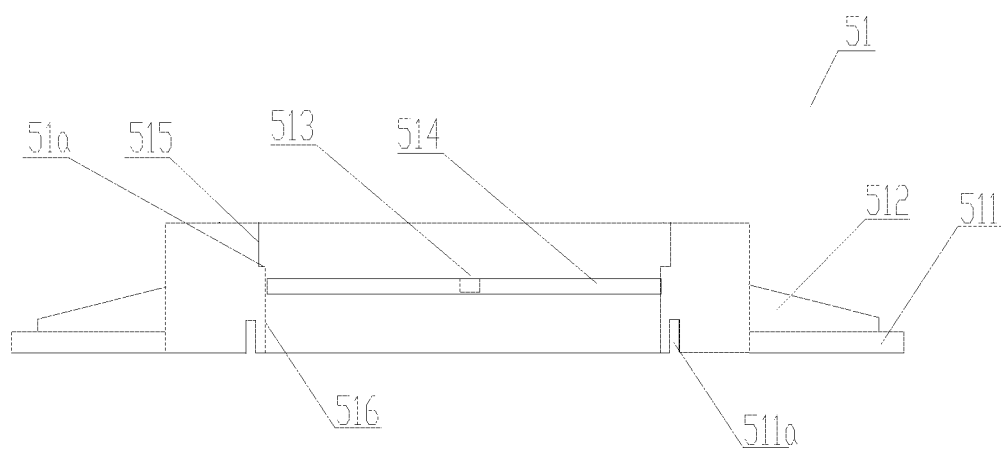
FIG. 4 is a structural schematic view showing a supporting section of a hollow cylinder according to the embodiment of the present application.
Figure 5:
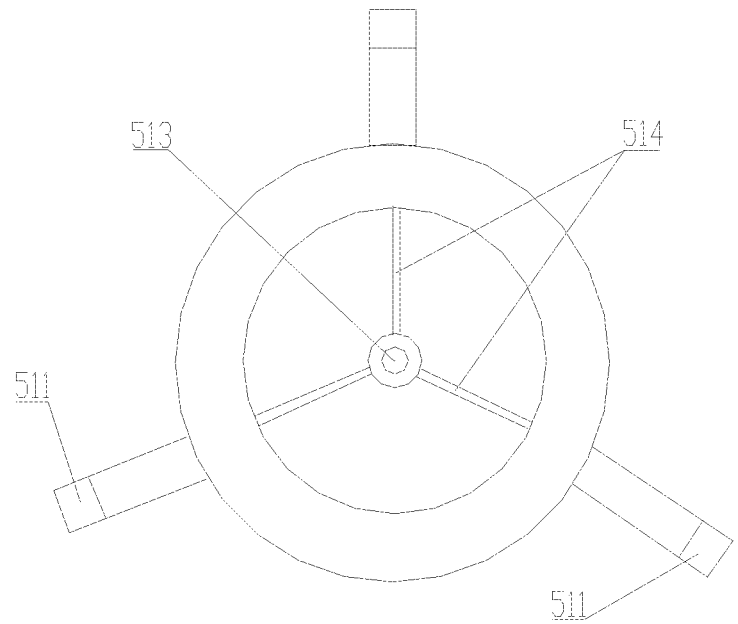
FIG. 5 is a schematic top view showing the hollow cylinder shown in FIG. 4.
Figure 6:
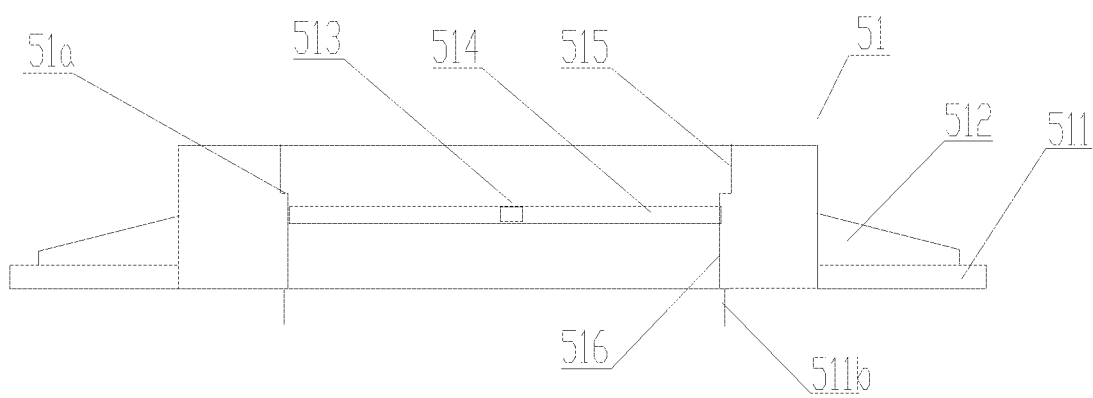
FIG. 6 is a structural schematic view showing a supporting section according to another embodiment of the present application.
Figure 7:
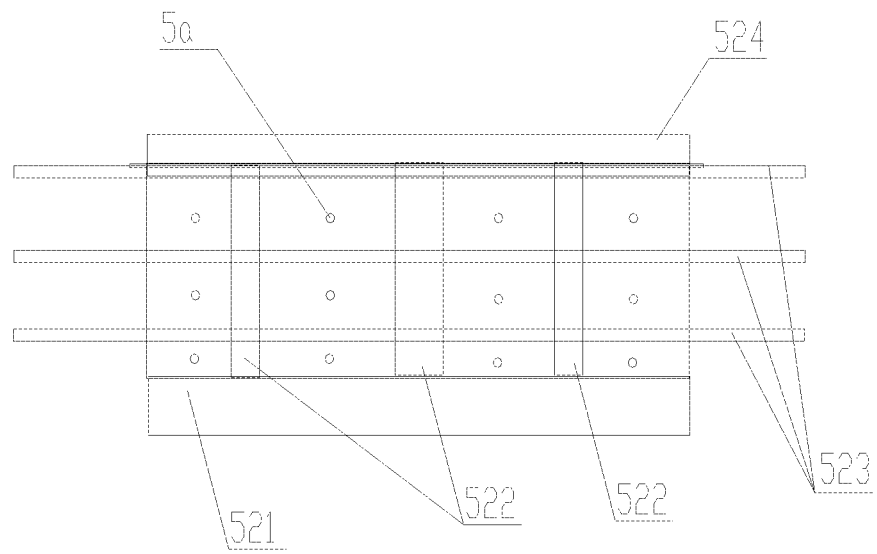
FIG. 7 is a structural schematic view showing a flow distributing section according to an embodiment of the present application.
Figure 8:
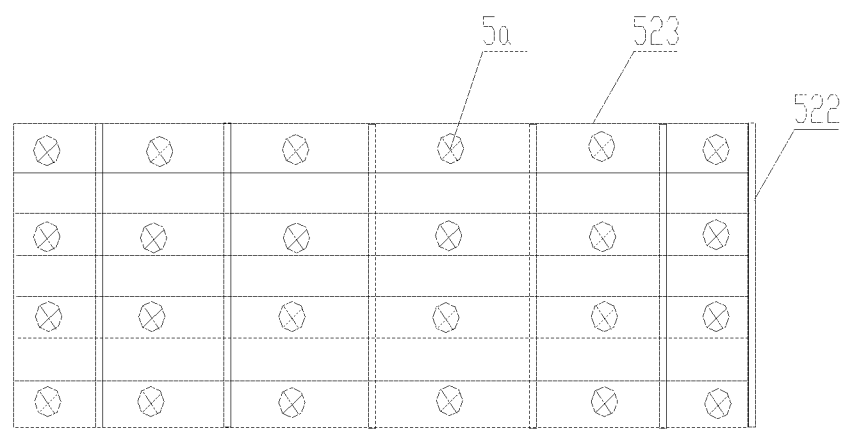
FIG. 8 is a structural schematic view showing an unfold flow distributing section according to an embodiment of the present application.
Figure 9:
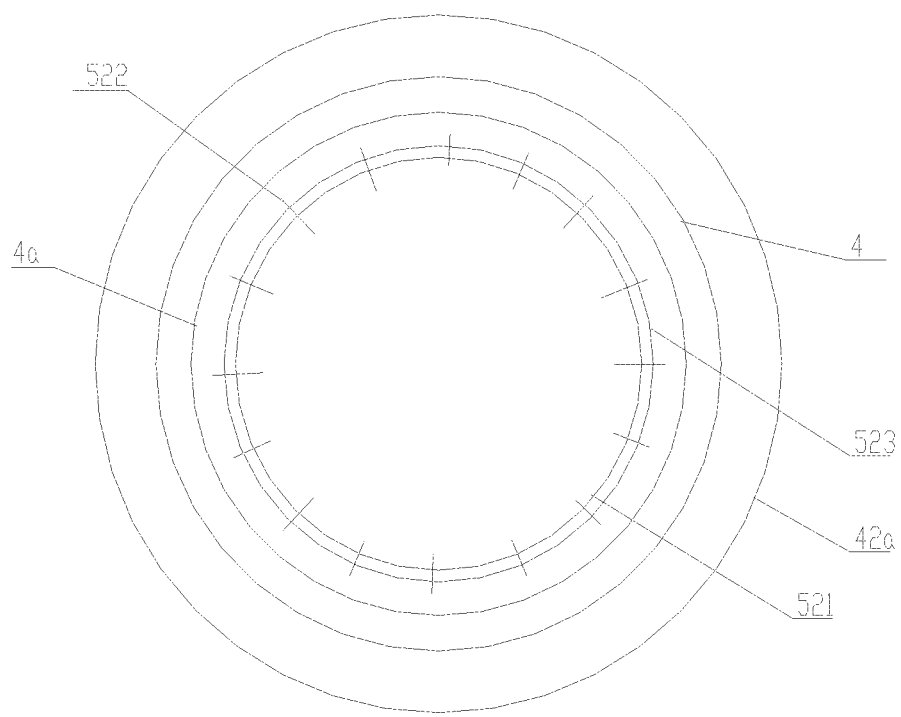
FIG. 9 is a schematic top view showing part of the components inside a heating furnace according to an embodiment of the present application.
Figure 10:
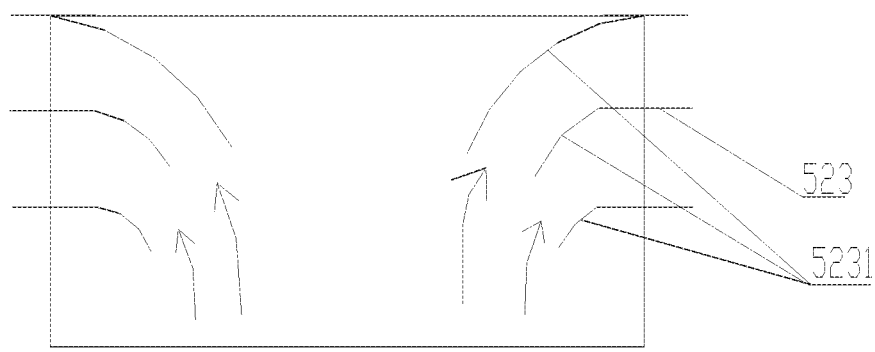
FIG. 10 is a partial sectioned view of a flow distributing section according to an embodiment of the present application.
Figure 13:
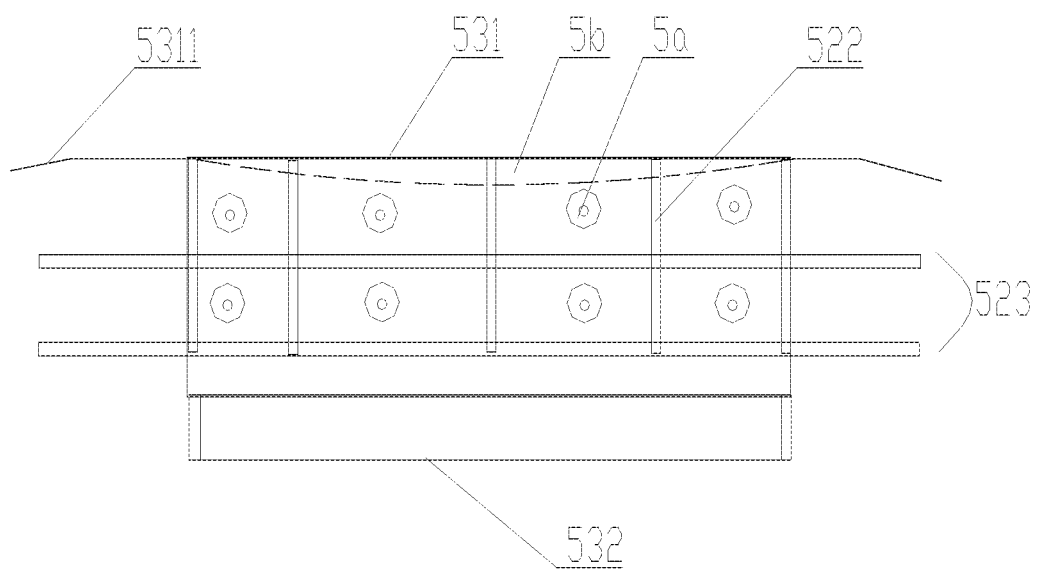
FIG. 13 is a structural schematic view showing an top section according to an embodiment of the present application.

Reference is made to FIG. 4 to FIG. 9 and FIG. 13. FIG. 4 is a structural schematic view showing a supporting section of the hollow cylinder according to the present application. FIG. 5 is a schematic top view showing the hollow cylinder shown in FIG. 4. FIG. 6 is a structural schematic view showing a supporting section according to another embodiment of the present application. FIG. 7 is a structural schematic view showing a flow distributing section according to the present application. FIG. 8 is a structural schematic view showing an unfold flow distributing section. FIG. 9 is a schematic top view showing part of the components in a healing furnace. FIG. 13 is a structural schematic view showing a top section.

In a preferable embodiment, as shown in FIG. 2, from bottom up, the hollow cylinder 5 may include a support section 51, a distributing section 52 and a top section 53. The second heat medium channels 5a are arranged at least on the circumferential surface of the distributing section 52, that is, the support section 51 and the top section 53 may be provided with the second heat medium channels 5a or not. In the preferable embodiment according to the present application, the support section 51 is not provided with the second heat medium channels 5a, and the top section 53 and the distributing section 52 are provided with the second heat medium channels 5a. The bottom of the support section 51 and the support platform are contacted and sealed circumferentially, and the top section 53 has a top lid 531 and the top lid 531 is a sealed structure.

All three sections of the support section 51, the distributing section 52 and the top section 53 may be an integral structure, or a separate structure. The adjacent ends of the support section 51, the distributing section 52 and the top section 53 are provided with fitting structures, that is, the adjacent assembly ends of each section all have fitting parts, the adjacent two sections are assembled together by the fitting parts. Preferably, the three sections according to the present application are of a separate structure. Specifically, the support section 51 and the distributing section 52 may be of an integral structure, and the above two sections and the top section 53 are of a separate structure, or each two of the three sections are of a separate structure.

Specifically, reference is made to FIG. 6. The support section 51 may include an annular base. Multiple horizontal feet 511 are arranged uniformly in a circumferential direction of an outer edge of the annular base. The annular component is supported on the upper surfaces of the horizontal feet 511, and the upper surfaces of the support feet 511 are provided with a positioning component fitting with the annular component for positioning. In this way, the annular component can be mounted on the horizontal feet 511 quickly through the positioning component.

The positioning component may be a spigot 512. In the case that the annular component is mounted on the horizontal feet 511, the inner circumferential surface of the annular component abuts against an outer wall of at least one spigot 512. The inner surface of the annular component may abut against one spigot 512, thus the spigot 512 may be made with a relative small accuracy, and the annular component may be mounted with a higher flexibility. Certainly, the inner surface of the annular component may abut against more than one or all spigots 512, thus the mounting position can be accurate. The spigot 512 may be formed by a convex block mounted on the horizontal foot 511.

In order to heat annular components with different inner diameters, the position of the spigot 512 can be adjusted in the radial direction, that is, the spigot 512 can slide with respect to the horizontal foot 511 in the radial direction. In this way, the annular components with different inner diameters, different weights, or different expansion requirements can be put into the same heating furnace and heated simultaneously, and can be taken out of the furnace at the same time or in batches, which can be adjusted according to the requirements of the production and assembly.

Similarly, in order to realize the quick mounting of the support section 51, one of the lower surface of the support section 51 and the upper surface of the support platform has a convex plate, and the other surface has a groove fitting with the convex plate.

Referring to FIG. 4 and FIG. 6, two specific embodiments of the support section 51 having a groove 511*a* and a convex plate 511*b* are respectively shown in the two figures, correspondingly, the upper surface of the support platform 22 is provided with a convex step and a groove.

When the heating of the multilayer annular components is completed, the upper annular base is required to be taken out of the heating furnace to facilitate the taking out of the lower annular component. The temperature of the annular base is usually relatively high then, so as to enable an operator to carry out the annular base quickly and safely from the heating furnace. The following designs are made according to the present application.

Referring to FIG. 5 again, a taking out seat 513 is arranged in the annular base. The taking out seat 513 is provided with a screw hole or a screw bolt. The taking out seat 513 is connected to the inner surface of the annular base via a holder 514. In this way, an operator can take the taking out seat 513 out of the heating furnace by using external tools fitting with the screw hole or the screw bolt on the taking out seat 513. By taking the taking out seat 513 with a screw hole as an example, the operator can use a handle provided with external thread part fitting with the screw hole at an end, rotate the handle to insert the external thread part into the screw hole, then lift the handle, and then take the support section 51 out of the heating furnace.

For mounting the annular base and the distributing section 52, the following methods are provided according to the present application.

According to a specific embodiment, the inner hole of the annular base includes a large diameter section 515 and a small diameter section 516. The large diameter section 515 and the small diameter section 516 are connected by a stepped surface 51*a*. A lower end of the distributing section 52 is a fitting section, and an outer diameter of the fitting section is larger than an inner diameter of the small diameter section 516 but smaller than an inner diameter of the large diameter section 515. The fitting section is located and mounted in the large diameter section 515 during assembly. As shown in FIG. 4, a bottom surface of the fitting section of the distributing section abuts against the stepped surface 51*a* and is supported on the stepped surface 51*a*.

According to the embodiment, a combination structure of the annular base and the distribution section is relatively simple, and the resistance to the heat medium fluid is relatively small.

Similarly, the above connection manner may be used between the adjacent distributing sections, and between the distributing section and the top section, that is, the two ends of the distributing section have connecting rings 524, and the lower end of the top section has a connecting section 532, thus achieving sleeve connection.

Figure 12:
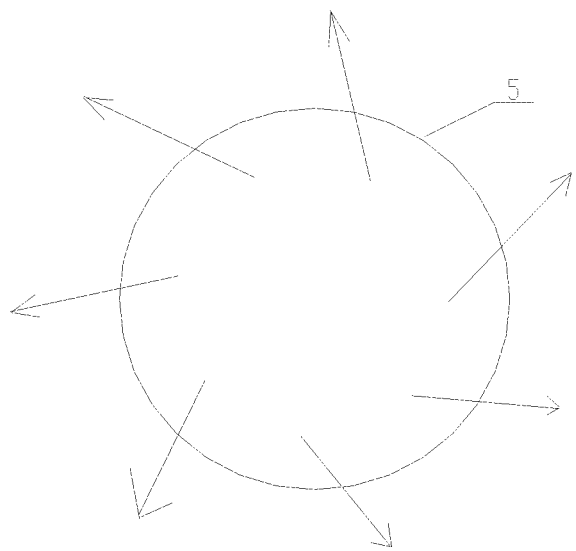
FIG. 12 is a schematic view of the flowing direction of the gas in the inner chamber of the hollow cylinder without rectification pieces according to an embodiment of the present application.

A direction of the gas flow ejected from the second heat medium channel 5*a* is further studied according to the present application. FIG. 12 shows the direction of the gas flow ejected from the second heat medium channel 5*a*. As can be seen from FIG. 12, the direction of the gas flow ejected from the second heat medium channel 5*a* is disordered, which is very bad for the uniform heating of the inner circumferential surface of the annular component, and the heat exchange efficiency is relatively low.

In order to address the technic issue of the uneven heating of the inner circumferential surface of the annular component and the low heat exchange efficiency, the structure of the hollow cylinder 5 is further improved according to the present application.

In a specific embodiment, the distributing section 52 according to the each embodiment above is provided with radially extended rectifying sheets around the inlet and outlet of each second thermal heat medium 5*a*. The corresponding rectifying sheets enclose an inner rectifying channel and an outer rectifying channel relatively in the circumferential direction. The heat medium in the hollow cylinder 5 is ejected to the inner circumferential surface of the annular component through the inner rectifying channel, the corresponding second heat medium channel and the outer rectifying channel in a listed sequence.

Figure 11:
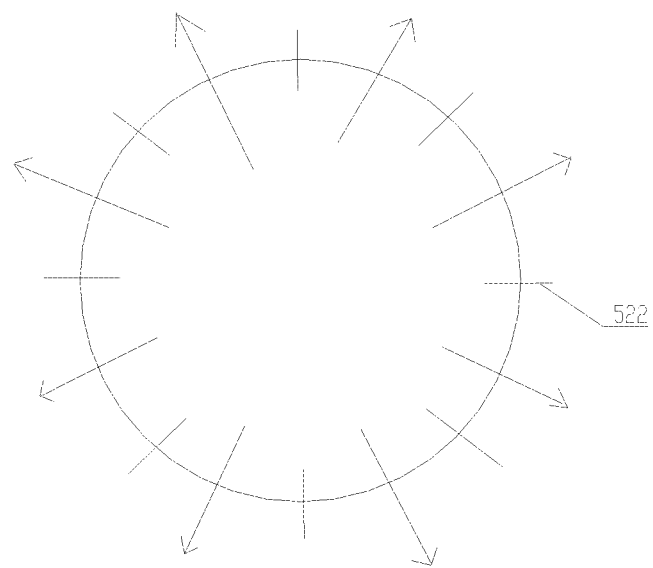
FIG. 11 is a schematic view of the flowing direction of the gas in the inner chamber of the hollow cylinder arranged with rectification pieces according to an embodiment of the present application.

In conjunction with the FIG. 11, FIG. 11 shows that the gas flow direction of the heat medium flows from the inner chamber of the hollow cylinder 5 via the second heat channels 5*a* after the arrangement of the rectifying sheets. As can be seen in FIG. 11, after the fluid medium is rectified by the vertical rectifying sheets, the heat medium basically flows out in the radial direction, that is, the gas flow is all adjusted to horizontally impact the inner surface of the annular component in the radial direction, thus realizing the synergism between the inner surface temperature field of the annular component and the fluid medium flow field, and improving the rate of the convective heat exchange.

Further, referring to FIG. 7 to FIG. 11, the distributing section 52 includes a cylinder body 521. The cylinder body

521 is provided with multiple annular rectifying sheets arranged in parallel and multiple vertical rectifying sheets arranged in parallel. Each of the annular rectifying sheets and the vertical rectifying sheets divides the inner surface and the outer surface of the cylinder body 521 into multiple grid structures. Each of the second heat medium channels 5a is arranged on the cylinder body 5a, and corresponds to the center of the grid structure. Furthermore, the end located in the cylinder body of each annular rectifying piece 523 is a guide arc 5231 which is bent downward, so as to guide part of the gas flow from vertical flow to horizontal flow. This arrangement of the rectifying sheets is simple and orderly.

In each embodiment above, referring to FIG. 13, an outer diameter of the top lid 531 is larger than an outer diameter of the rectifying sheets of each distributing section 52, and the outer edge of the top lid 531 is a downward bending section 5311. This is favorable for the gas flowing from the second heat medium channel 5a close to the top lid 531 to be ejected to the inner circumferential surface of the annular component, thus avoiding a case that the gas flows out from between the top lid 531 and the annular component without being ejected to the inner circumferential surface of the annular component, and enhancing the heating efficiency of the annular component.

As described hereinbefore, the support section 51, the distributing section 52 and the top section 53 may be a separate structure. Specifically, among the three of the top section 53, the support section 51 and the distributing section 52, at least the top section 53 and the other two are of a separate structure, the support section 51 and the distributing section 52 are of a group. There are at least two groups, and each group is stacked sequentially from the bottom up. Each annular component is supported on the corresponding support section 51 respectively. One top section 53 is provided, and the top section 53 is buckled to the upper part of the top group of the distributing section 52.

Thus, by varying the numbers of the assembled support section 51 and distributing section 52, two or more annular components can be heated simultaneously in one heating furnace. That is, according to the production and assembly requirements of the annular components (such as bearings), the numbers of the support section 51 and the distributing section 52 of the annular components are correspondingly increased or decreased. For example, in the case that only one annular component is heated, the heating process requirements can be satisfied by using the support section 51 and the distributing section 52 of one annular component.

Accordingly, in the case that two annular components are required to be heated at the same time, a support section 51 and a distributing section 52 can be added on top of the distributing section 52 at the bottom.

In addition, when the three of the top section 53, the support section 51 and the distributing section 52 are of a detachable structure, the number of the distributing section 52 can be increased appropriately to meet the heating requirements of the annular components with different heights according to the height of the annular component, thus enhancing the flexibility of using the heating furnace.

According to the present application, the upper end of the hollow cylinder 5 is a concave surface. A notch 5b of the concave surface faces the centrifugal fan and is located at or under the negative pressure zone of the centrifugal fan. That is, the upper end surface forms an recessed cavity having an upward opening, and the recessed cavity increases the amount of the gas contained in the negative pressure zone of the centrifugal fan. Preferably, the notch 5b directly faces the center of the centrifugal fan.

When the centrifugal fan accelerates, since the notch 5b has a certain amount of gas storage, the gas in the notch 5b can prevent the gas in the negative pressure zone from being sucked instantly and completely, or, the gas in the notch 5b near the negative pressure zone can be quickly replenished to the negative pressure zone, and the instant and complete suction of the gas in the negative pressure zone can be avoided as well. That is, this can prevent the pressure of the negative pressure zone from dropping suddenly, reduces the pressure difference between the negative pressure zone and the surrounding region, facilitates the surrounding gas to flow toward the negative pressure zone slowly, and avoids the occurrences of empty noises or vibrations due to a too high velocity of the gas flow. Moreover, since the pressure variation of the negative pressure zone is relatively small, the pressure difference between the external pressure of the shafting connected to the centrifugal fan blade and the negative pressure zone below the centrifugal blade is relatively small too, accordingly, the downward force acting on the shaft of the centrifugal fan is relatively small, and accordingly, the upward axial force that the bearing 6 subjected to for counteracting the downward force is relatively small, in other words, since the increase of the axial force of the bearing 6 due to the acceleration of the centrifugal fan is relatively small, the friction force subjected by the bearing 6 is correspondingly small, which alleviates the wear of the bearing 6 greatly, and enhances the service life of the bearing 6.

When the centrifugal fan is slowed down, the space of the negative pressure zone is enlarged because of the existence of the notch 5b. The gas converging from the surroundings to the negative pressure zone can be compressed to the notch 5b. Compared with the prior art, the amount of the gas converging to the negative pressure zone is the same under the same deceleration condition, however, the gas compression space is relatively large due to the existence of the notch 5b according to the present application, so the pressure of the compressed gas is relatively small, the upward axial force of the compressed air on the impeller of the centrifugal fan is relatively small, and the reacting force to which the bearing 6 subjected to overcome the upward axial force F1 is correspondingly small, which reduces the situation that the bearing 6 operates at a high speed while being subjected to a relative large axial force F1, alleviates the wear of the bearing 6, and enhances the service life of the bearing 6.

Referring to FIG. 1 and FIG. 3, the heating furnace also has first heating components 7 and second heating components 8 in general, the first heating components 7 are arranged inside the heat medium channel formed by the annular guide plate 42 and the circumferential surface of the furnace body, and the heat medium is heated when flowing through the heat medium channel between the annular guide plate 42 and the circumferential surface of the furnace body. The second heating components 8 are arranged uniformly inside the heat medium channel formed by the annular guide plate 42 and the bottom wall of the furnace body, and heat the heat medium flowing between the annular guide plate 42 and the bottom wall of the furnace body.

The second heating components 8 are used to compensate the energy of the inside fluid, and control the relationship of the inside temperature value and the outside temperature value. Depending on the inside through-flow spatial structure shown in FIG. 11, The construction of the annular heating space of fluid medium, the distribution, transport and radial centripetal rectification of the radial gas flow in the annular flow channel of the top lid of the device to face the outer surface of the annular component are realized, and the energy transmission from the fluid medium to the outer surface is accomplished.

Further, referring to FIG. 3, in order to satisfy the different temperature requirements of the heating furnace, the heating power output of the heaters (the first heating components 7 and the second heating components 8) can be adjusted via a temperature controller, and the heat exchange rate between the gas and the heaters can be changed by adjusting the gas volume and the gas velocity of the centrifugal fan via the arrangement of a frequency converter 10.

It is needed to be illustrated that, the terms "first", "second" and the like in the present application are used for distinguishing between the parts which are same or similar in structure and function, and are not intended to describe a specific sequence or precedence order.

A heating furnace for heating annular components provided by the embodiments of the present application is described in detail hereinbefore. The principle and the embodiments of the present application are illustrated herein by specific examples. The above description of examples is only intended to help the understanding of the method and the spirit of the present application. It should be noted that, for the person skilled in the art, a few of modifications and improvements may be made to the present application without departing from the principle of the present application, and these modifications and improvements are also deemed to fall into the scope of the present application defined by the claims.

What is claimed is:

1. A heating furnace for heating an annular component, comprising:
   a furnace body, wherein the furnace body encloses a sealed heating space, and the furnace body is equipped with a heat medium driving component and a support part for the annular component, and an interior of the furnace body further comprises:
   a guide part, comprising a top plate and an annular guide plate extending vertically downward from the circumference of the top plate, wherein the top plate and the annular guide plate together with respective inner walls of the furnace body form heat medium channels, the top plate has a backflow through hole at a position opposite to the heat medium driving component, the annular guide plate is mounted on the periphery of the annular component and has a number of first heat medium channels which are extended radially, each of which faces exactly to an outer circumferential surface of the annular component;
   a hollow cylinder, which is arranged in the annular component, and a circumferential space is preset between the hollow cylinder and the annular component, an upper end surface of the hollow cylinder is of a sealed structure, a lower edge of an inner circumferential surface of the annular component and an outer circumferential wall of the hollow cylinder form a sealed structure, and an inner chamber of the hollow cylinder is communicated with the heat medium channels formed by the annular guide plate and a bottom wall of the furnace body, the hollow cylinder has second heat medium channels which are extended radially, and each of the second heat medium channels is opposite to the inner circumferential surface of the annular component.

2. The heating furnace according to claim 1, wherein the support part comprises a holder and a support platform, the support platform is supported on a bottom wall of the furnace body via the holder, the annular component and the hollow cylinder are both supported on an upper surface of the support platform, a lower surface of the annular guide plate and the lower surface of the hollow cylinder are both bonded and sealed circumferentially with the support platform, the heat medium channels formed by the support platform and the bottom wall of the furnace body are communicated with the inner chamber of the hollow cylinder via an interior of the support platform.

3. The heating furnace according to claim 2, wherein the support platform is provided with through holes at positions corresponding to the inner chamber of the hollow cylinder, the heat medium channel formed by the support platform and the bottom wall of the furnace body is communicated with the inner chamber of the hollow cylinder via the through holes on the support platform.

4. The heating furnace according to claim 2, wherein, from the bottom up, the hollow cylinder comprises a support section, a distributing section and a top section, and the second medium channels are at least set on the circumferential wall of the distributing section, a bottom of the support section and the support platform are circumferentially contacted and sealed, the top section has a top lid, and the top lid is a sealed structure.

5. The heating furnace according to claim 4, wherein, the support section comprises an annular base, horizontal feet are arranged uniformly in a circumferential direction of the outer edge of the annular base, the annular component is supported on the horizontal feet, and the upper surfaces of the support feet are provided with a positioning component fitting with the annular component for positioning.

6. The heating furnace according to claim 5, wherein, the positioning component is a spigot, in the case that the annular component is mounted on the horizontal feet, the inner circumferential surface of the annular component abuts against an outer wall of at least one spigot.

7. The heating furnace according to claim 6, wherein, a position of the spigot on a corresponding horizontal foot is adjustable in a radial direction.

8. The heating furnace according to claim 5, wherein, a taking out seat is arranged in the annular base, the taking out seat is provided with a screw hole or a screw bolt, and the taking out seat is connected to an inner surface of the annular base via holders.

9. The heating furnace according to claim 5, wherein, from the top down, an inner hole of the annular base comprises a large diameter section and a small diameter section, the large diameter section and the small diameter section are connected by a stepped surface, a lower end of the distributing section is a fitting section, an outer diameter of the fitting section is larger than an inner diameter of the small diameter section but smaller than an inner diameter of the large diameter section, the fitting section is mounted in the large diameter section and supported on the stepped surface during assembly.

10. The heating furnace according to claim 4, wherein, the distributing section is provided with radially extended rectifying sheets around the inlet and outlet of each second thermal heat medium channel each of the rectifying pieces enclose an inner rectifying channel and an outer rectifying channel relatively, the heat medium in the hollow cylinder is ejected to the inner circumferential surface of the annular component via the inner rectifying channel, a corresponding second heat medium channel and the outer rectifying channel in a listed sequence.

11. The heating furnace according to claim 10, wherein, the distributing section comprises a cylinder body, and the cylinder body is provided with a plurality of annular rectifying sheets arranged in parallel and a plurality of vertical rectifying sheets arranged in parallel, each of the annular rectifying sheets and the vertical rectifying sheets divides the inner surface and the outer surface of the cylinder body into a plurality of grid structures, each of the second heat medium channels is arranged on the cylinder body, and corresponds to the center of the grid structure, and an end located in the cylinder body of each annular rectifying piece is a guide arc which is bent downward.

12. The heating furnace according to claim 10, wherein, an outer diameter of the top lid is larger than an outer diameter of each of the rectifying sheets of the distributing section, and an outer edge of the top lid is a downward bending section.

13. The heating furnace according to claim 4, wherein, among the three of the top section, the support section and the distributing section, at least the top section and the other two are of a separate structure, the support section and the distributing section are of a group, there are at least two groups, and each group is stacked sequentially from the bottom up, each annular component is supported on the corresponding support section respectively, and one top section is provided, the top section is buckled to the upper part of the top group of the distributing section.

14. The heating furnace according to claim 13, wherein, the three of the top section, the support section and the distributing section are of separated structure.

15. The heating furnace according to claim 4, wherein, one of the lower surface of the support section and the upper surface of the support platform is provided with a convex step, and the other is provided with a groove fitting with the convex step.

16. The heating furnace according to claim 1, wherein, a plurality of first heating components are arranged uniformly in the heat medium channel formed by the annular guide plate and the circumferential surface of the furnace body, and a plurality of second heating components are arranged uniformly in the heat medium channel formed by the annular guide plate and the bottom wall of the furnace body.

17. The heating furnace according to claim 1, wherein, the heat medium driven part is a centrifugal fan, the centrifugal fan is hoisted above the hollow cylinder, the upper end of the hollow cylinder is a concave surface, and the notch of the concave surface faces the centrifugal fan and is located in or under the negative pressure zone of the centrifugal fan.

* * * * *